INVENTOR
JAMES S. SHREVE

INVENTOR
JAMES S. SHREVE

United States Patent Office 3,443,873
Patented May 13, 1969

3,443,873
CELESTIAL DIRECTION FINDER
James S. Shreve, 2055 N. Brandywine St.,
Arlington, Va. 22207
Filed Feb. 7, 1964, Ser. No. 343,403
Int. Cl. G01b *11/24;* G09b *27/06;* H01j *3/14*
U.S. Cl. 356—168      3 Claims

ABSTRACT OF THE DISCLOSURE

A device which determines direction in space relative to the stars, comprising a spherical star map opaque except for transparent lines which represent star locations; an optical means which projects an image of the stars onto the star map; a means for scanning two independent parameters which determine the alignment of the star map with respect to the image of the stars, the extension of the transparent lines eliminating the need of scanning in the third parameter; and a photoelectric means for indicating alignment of the star map and the image of the stars.

---

This invention relates to a direction finder, and more particularly to a device which determines direction in space with respect to the stars.

The angular positions of the stars are known quite accurately, and these angular positions would appear the same to observers anywhere in the vicinity of the solar system, owing to the great distances to the stars. Therefore, direction in space may be ascertained by observing the stars; i.e., comparing their positions relative to the observer with the known star positions. This method of direction finding is applicable to instrument alignment and vehicle navigation, and is particularly applicable to the navigation of space vehicles operating in or near the solar system.

In the past this method of direction finding has been accomplished both by measuring angles optically to individual stars, and by optically aligning a star map or chart with the stars, thereby effectively measuring the angles to many stars simultaneously. These means in general have been time consuming, and have involved human operators or complex, delicate, and bulky equipment. These may be highly undesirable encumbrances, especially in applications to space craft and space instruments.

It is, accordingly, an object of this invention to provide a small, simple, automatic device, which determines direction in space.

It is a further object of the invention to provide a novel star map and a means for projecting an image of the star field thereon.

It is a further object of the invention to provide a simple scanning action of the star map.

It is a further object of the invention to provide a means of producing an electrical signal whose amplitude is proportional to the mathematical correlation between the star images and the star map.

It is a further object of the invention to provide a device which automatically and continually determines the two angles which show the relationship between the device and a preselected direction in space.

These and other objects of the invention will be apparent from the following description having reference to the accompanying drawings, it being intended that the specific embodiments therein shown shall be taken as being merely illustrative and not restrictive.

In the drawings—

Figure 1:
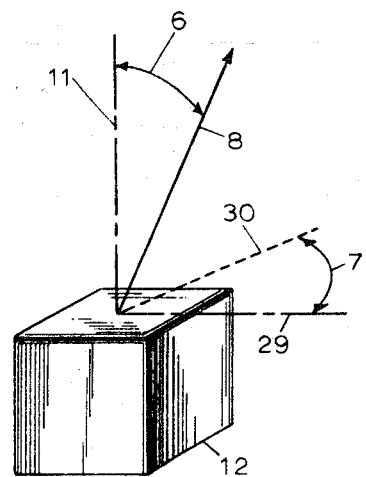
FIGURE 1 is a geometric diagram illustrating the angles measured by the direction finder.

Referring to FIGURE 1, the specific information determined by the direction finder is the values of the polar angle 6 and the azimuth angle 7 of any preselected direction 8, hereinafter referred to as the "reference direction." The polar angle is the angle between the axis 11 of the direction finder 12 and the reference direction; the azimuth angle is the angle between the axis 29 of the direction finder and the projection 30 of the reference direction 8. The projection is made onto the plane containing axis 29 and having axis 11 as a normal. The particular reference direction chosen determines the configuration of a star map which is an integral part of the direction finder, and hence once chosen the reference direction is inherent in the device.

Figure 2:
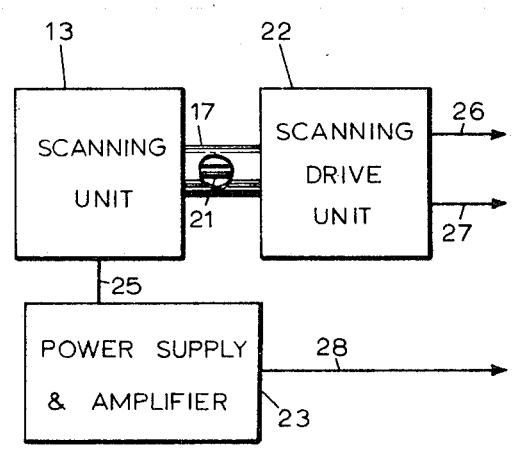
FIGURE 2 is a block diagram of the direction finder.

As shown in FIGURE 2, the direction finder consists of a scanning drive unit 22, a scanning unit 13 mechanically driven by said scanning drive unit, by means of shafts 17 ad 21, and a power supply and amplifier 23 electrically connected to the scanning unit by lines 25.

Figure 3:
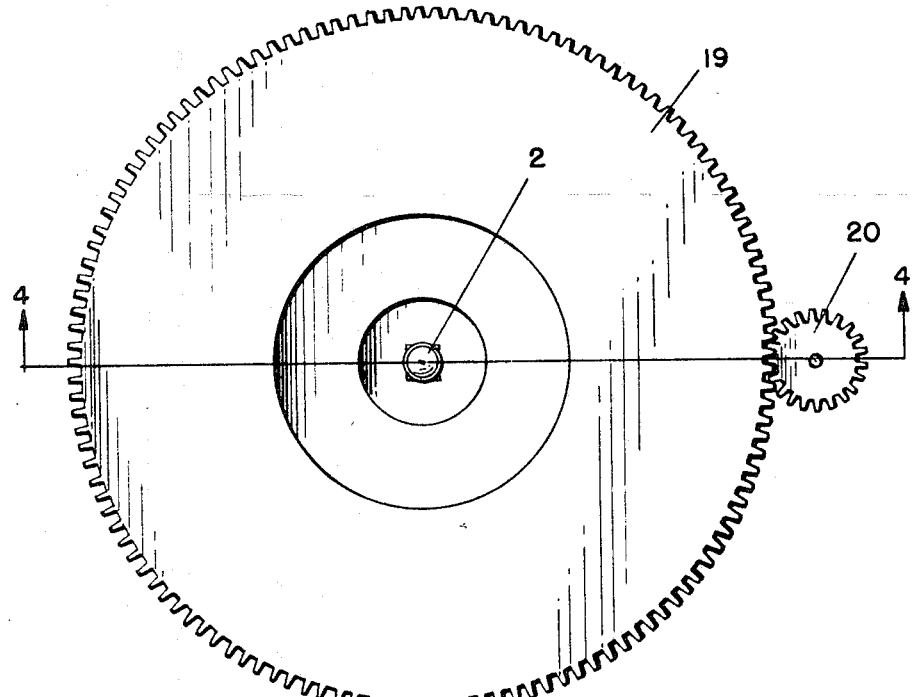
FIGURE 3 is the plan view of the scanning unit.

Referring to FIGURE 3, a rotating lens and mirror assembly 2 is exposed to the exterior, allowing starlight to fall upon it.

Figure 4:
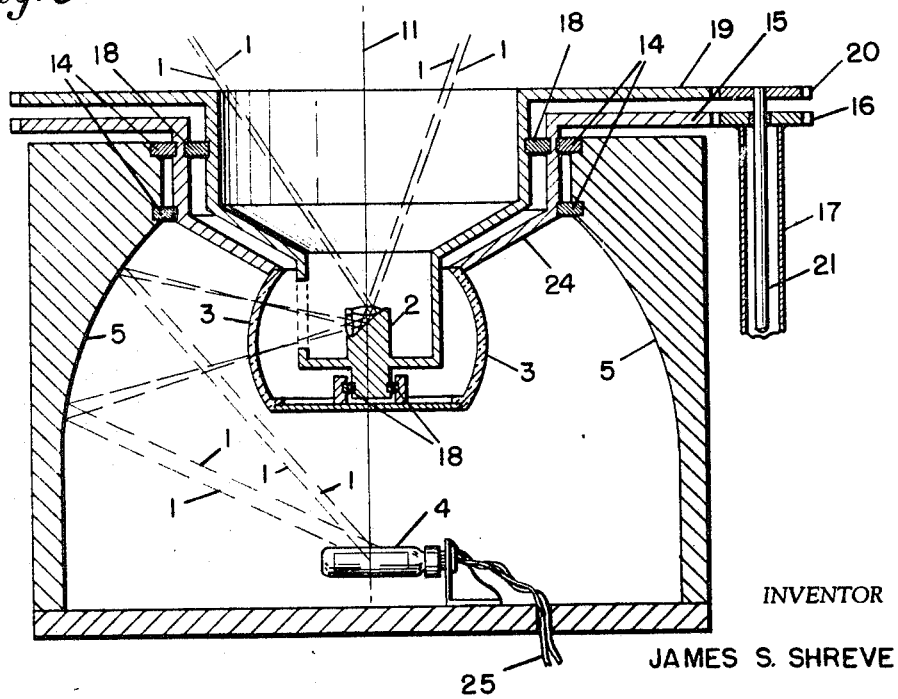
FIGURE 4 is a vertical section of the scanning unit taken along line 4—4 of FIGURE 3.

Referring to FIGURE 4, light rays 1 from the stars are focused by the rotating lens and mirror assembly 2, onto a rotating star map 3. Light striking the star map at transparent areas is free to pass through the map onto an ellipsoidal reflector 5, which directs it to a photosensitive device 4. The center of the star map lies at one focus of the ellipsoidal reflector; the photosensitive device lies at the other focus of the ellipsoidal reflector. The output of the photosensitive device indicates how well the images of the stars coincide with the transparent areas on the star map at that particular instant.

Consider, for the moment, that the star map were an ordinary spherical star map, constructed so as to be transparent only at the known positions of the stars, and made to the same scale as the lens-formed image of the stars; consider further that this hypothetical map could be moved in a manner such that every possible orientation of the map with respect to the star images is assumed at some instant; then the photosensitive device would indicate by virtue of a great output the instant the star map and star images coincided. The state of the mechanism driving the map at the instant of coincidence would indicate the position of the stars relative to the device, which likewise indicates the orientation of the reference direction with respect to the device.

With an ordinary star map, in order to assume all possible orientations, the scanning pattern must exhaust all possible combinations of values of three independent parameters. For a spherical map, the map must in effect rotate about three mutually perpendicular axes. Note that in any scanning operation of more than one parameter, all possible combinations of values cannot be assumed precisely in a finite time, but they can be assumed to a given degree of resolution in a finite time.

Because of the time element required to achieve the desired resolution and the complexity and bulk of the equipment required to scan over three parameters, the present invention utilizes a novel star map which reduces the required scanning operation to one involving two parameters.

The novelty of the star map lies in its representation of stars as lines rather than geometric points. Each line passes through the point which would normally represent the star. By construction, the background of the map is opaque, while the lines representing the stars are partially transparent. The percent of starlight which a given line will pass is made proportional to the apparent intensity of the star it represents.

The plurality of lines constituting a map are all aligned in a manner such that one of the ordinary scanning parameters would normally be varied by a motion, whether linear or rotary, in the direction of the lines. Thus, this particular ordinary scanning motion can be eliminated, as the star map appears to be oriented the same regardless of any displacement in this direction.

It is conceded that the novel star map contains less information than an ordinary star map, and that the lens-formed image of any one given star will coincide with the corresponding star representation on the novel star map in an infinite number of positions. However, due to the random placement, and distribution of apparent intensities of stars in the sky, the star representations form a unique pattern of lines that will pass a maximum of starlight in one definite orientation with respect to the image of the star field. This relative orientation will be the condition of simultaneous coincidence of each star image with its representation on the map. Note that not every star in the sky is actually involved in a given circumstance, as the field of view of the image-projecting lens is limited to a portion of the sky.

Figure 5:
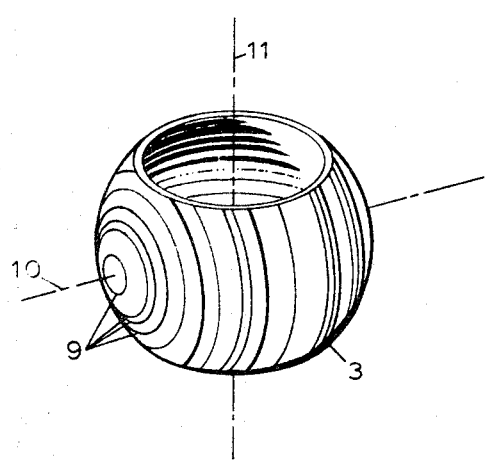
FIGURE 5 is a perspective view of the star map.

In the embodiment of the invention given here in detail, referring to FIGURE 5, the star map 3 is in the form of a generally opaque spherical shell whereon the stars are represented by transparent circles 9, all circles having their centers on a common axis 10 passing through the center of the spherical shell. The axis 10 will hereinafter be referred to as the "reference axis."

Because of the symmetry of the star representations about the reference axis 10, rotation about this axis produces no real scanning effect and is omitted; a complete scanning operation is accomplished by motions of the map and of the lens-mirror assembly which are equivalent to rotation of the map about two axes perpendicular to each other and to the reference axis.

The map is so constructed that the star representations are oriented with respect to the reference axis in the same way that the real stars are oriented with respect to the reference direction, the only difference being that the real stars appear as points, whereas the representations on the map appear as points rotated about the reference axis—i.e., circles.

The reference axis 10 of the star map lies at right angles to the coordinate axis 11. Referring to FIGURE 4, the star map 3 is truncated at the upper end to allow light rays to enter. The lower end is also truncated for ease of construction and other mechanical considerations, as the central zone which spans the usable image formed by the lens-mirror assembly 2 is the only portion optically utilized.

The star map 3 is supported by a cradle 24, which in turn is supported by bearings 14, which allow it to rotate about the axis 11. The lens-mirror assembly 2 is supported by bearings 18, which likewise allow it to rotate about the aixs 11. Rotation of these two members about axis 11 constitutes the scanning motion; it is, in effect, equivalent to rotating the map about two perpendicular axes.

Figure 6:
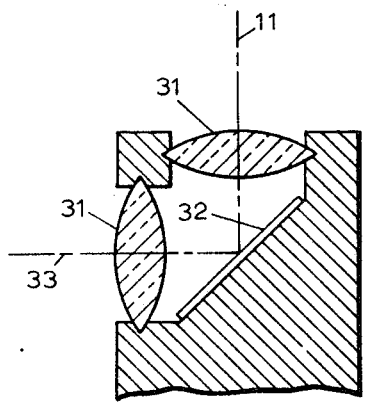
FIGURE 6 is an enlarged detail of FIGURE 4 showing a portion of the lens-mirror assembly.

Referring to FIGURE 6, the lens-mirror assembly comprises lens elements 31 and a mirror 32, which project an image of the stars on the inner surface of the star map. The optical axis of this assembly for entering rays of light coincides with axis 11. The mirror, inclined at an angle of 45 degrees of the axis, causes the optical axis 33 for emerging rays of light to lie at right angles to axis 11. The lens-mirror assembly is situated inside of the star map, the optical center of the lens-mirror assembly coinciding with the center of the star map.

Now consider those star images which are projected upon the equator of the star map. By equator is meant the intersection of the star map and a plane passing through its center, and having axis 11 as a normal.

The stars giving rise to these images may be considered as lying on a great circle of the celestial sphere. Referring to FIGURE 1, the axis 11 intersects this circle, and rotation of the lens-mirror assembly also rotates this circle about the same axis. When the optical axis 33 (see FIGURE 6) of the lens-mirror assembly reaches a point 90 degrees beyond the projection 30 of the reference direction 8, the said circle of the celestial sphere intersects the reference direction. In this state the direction finder will display the same star images on the equator of the star map regardless of the value of the polar angle 6.

This position of the lens-mirror assembly with respect to the coordinates of the direction finder is therefore dependent on azimuth angle 7 but independent of polar angle 6. As this position is also the one assumed at coincidence of the star map and the star images, it serves as a measure of azimuth angle.

For purposes of illustration, assume that a star lies in the reference direction. Its image, under the above conditions, will lie on the equator of the star map, or would lie there if it were within the field of view of the lens-mirror assembly. A rotation of the star map could therefore bring the corresponding star representation into coincidence with this image. At this point, all other images and their corresponding representations must coincide also, as the reference axis is properly aligned, and all star representations are symmetric about the reference axis and properly spaced with respect to this axis. Thus, coincidence of the star images and the star map is attained under the conditions described above.

Note that this specified position of the star map with respect to the lens-mirror assembly is independent of azimuth angle 7, as various values of azimuth angle merely represent various relative angular positions of the direction-finder coordinates about the lens-mirror assembly and the star map, both of which could be considered—for the sake of argument—fixed in space. Since this position of the star map is assumed at coincidence of the star map and the star images, it serves as a measure of polar angle.

It is apparent from the geometry that the above conditions for coincidence are not truly unique, but that there exists two distinct sets of readings of lens-mirror displacement and star map displacement which will produce coincidence. These two sets of readings actually represent equivalent values of azimuth angle and polar angle, however, as the two azimuth angles differ by 180 degrees, while the corresponding polar angles differ in algebraic sign only. Thus, the direction finder indicates the same direction in two different but equivalent ways during its operation.

As shown in FIGURE 2, a scanning drive unit 22 is mechanically connected to the scanning unit 13 by concentric shafts 17 and 21. Referring to FIGURE 4, this scanning drive unit rotates the star map and lens-mirror assembly by means of the shafts 17 and 21; the drive gears 16 and 20 attached thereto; a gear 15 integral with the cradle 24 and meshing with gear 16 and thus driven by gear 16; and a gear 19 integral with the lens-mirror assembly 2 and meshing with gear 20 and thus driven by gear 20. The resulting rotations of the star map 3 and the lens-mirror assembly 2 are in a counterclockwise direction when viewed from above.

The scanning drive unit itself employs a motor and gear arrangement which cause the shafts 17 and 21 to rotate at constant and known angular velocities. The ratio of speeds between the two shafts is made to be such that the star map rotates one full revolution for each small increment of a revolution of the lens-mirror assembly, although it is recognized that other speed ratios can be successfully employed here. Thus, upon completion of one full revolution of the lens-mirror assembly, all possibe combinations of angular displacements, to a certain resolution, will have been assumed. This scanning cycle repeats as long as the direction finder is in operation. Note that twice each cycle the star images and star map must coincide because of the exhaustive nature of the scanning cycle.

As shown in FIGURE 2, a power supply and amplifier 23 is connected electrically by lines 25 to the photosensitive device in the scanning unit 13. This power supply and amplifier supplies the photosensitive device with its required electrical potentials, and also amplifies the output of the photosensitive device. The amplified output signal appears on output line 28.

Now the total light flux passing through the map is the sum of the contributions passing through each incremental area of the map. Each contribution is proportional to the product of the light flux striking the incremental area times the coefficient of the transmission of that area. Shifting the map in a scanning pattern thus causes the total light flux to vary in a manner which indicates how well the star images are aligned with the star map throughout the scanning cycle. The flux amplitude is, in fact, proportional to the mathematical convolution function of functions which describe the star images and the star map respectively. The amplified output waveform, appearing on line 28, of the photosensitive device, then follows this convolution function also. From the convolution function, using well-known mathematical manipulations, a true correlation function could be formed.

If optimum performance is not required and if the correlation function is not desired for other purposes, the correlation function need not be formed. Rather, the highest amplitude of the amplified output waveform of the photosensitive device may be used directly to indicate alignment of the star map and the star images.

The scanning drive unit also employs a means for determining the angular positions of both the star map and the lens-mirror assembly, and supplies this information on output lines 26 and 27, one line serving to indicate the position of the star map, the second line serving to indicate the position of the lens-mirror assembly. An electrical impulse occurs on line 26 when the reference axis of the star map coincides with the coordinate axis 29 (see FIGURE 1), and an electrical impulse occurs on line 27 when the optical axis 33 (see FIGURE 6) coincides with the same coordinate axis 29, although it is recognized that other means of electrically indicating position can be successfully employed here.

The output of the direction finder thus consists of electrical signals appearing on lines 26 and 27, which, together with the knowledge of the angular velocities of the star map and the lens-mirror assembly, indicate the angular displacements of the star map and the lens-mirror assembly as functions of time; and electrical signals appearing on line 28 which indicate the instant of coincidence of the star map and the star images. The angular position of the lens-mirror assembly, less 90 degrees, and the difference in angular positions of the star map and lens-mirror assembly, at the instant coincidence is indicated, are equal to the azimuth angle and the polar angle respectively of the reference direction.

What is claimed is:
1. A star map for a direction finder comprising a spherical shell being everywhere opaque except for a plurality of relatively transparent circles all concentric about a reference axis through the center of the spherical shell, the said circles being located on the spherical shell such that each circle includes one of a like plurality of points on the said spherical shell which represent the relative positions of a like plurality of stars in the celestial sphere, said circles by their configuration eliminating the need of any motion about the said reference axis in order to cause each of the relatively transparent circles of the star map to simultaneously coincide with the location of the corresponding star in an image of the said like plurality of stars projected to the proper scale upon the surface of the spherical shell.

2. A star map for a direction finder according to claim 1, characterized further by each of the said circles having a coefficient of light transmission proportional to the intensity of the corresponding star image.

3. A direction finder comprising:
  (a) a star map according to claim 12, characterized further by the said spherical shell being truncated by a plane parallel to the said reference axis, thereby leaving an aperture through which light rays from the stars may enter;
  (b) a means for mounting the said star map including bearings which allow the said star map to rotate about an axis of rotation passing through its center and through the center of the said aperture;
  (c) an optical means having an optical center and an optical axis for entering rays of light for projecting images of the stars, said means including lens elements and a mirror, said mirror being located at the said optical center and being inclined at an angle of 45 degrees to the said optical axis, said means having said optical center coincident with the center of the said star map and having the said optical axis coincident with the said axis of rotation, said means thereby projecting an image of the stars in the region of the celestial sphere near the said axis of rotation upon the inner surface of the said star map;
  (d) a means for mounting the said optical means including bearings which allow the optical means to rotate about the said axis of rotation;
  (e) a scanning means connected to the said star map mounting means and the said optical means mounting means which causes the said star map and the said optical means to each rotate about the said axis of rotation, the ratio of the two angular velocities being great, thereby causing the said star map and the said optical means to momentarily assume within a small angular error all possible combinations of angular positions, each of the said combinations of angular positions determining a distinct relative orientation of the image of the stars projected by the said optical means and the said star map;
  (f) a means for determining the amount of starlight passing through the said transparent circles of the said star map, said means including a portion of a hollow ellipsoidal reflector having the center of the said star map at one focus; a photosensitive device which produces an electric signal whose amplitude varies with the amount of light the said device intercepts, said device being located at the second focus of the said reflector; an amplifier connected to the said photosensitive device which amplifies the signal output of the said photosensitive device to a convenient level; and a power supply connected to the said photosensitive device and said amplifier;
  (g) indicating means connected to the said scanning means which generates signals on each of two output lines, a signal appearing on one of the said lines at each moment the said star map assumes some predetermined angular position and on the other of the said lines at each moment the said optical means assumes some predetermined angular position, said indicating means, by virtue of the relative time of occurrence of the said signals with respect to the occurrence of the greatest amplitude of the output of the said amplifier, indicating the angular positions of the said star map and the said optical means required to align an image of the stars with the said star map, and thereby the relative orientation of the said direction finder with respect to the stars in the celestial sphere.

References Cited

UNITED STATES PATENTS 3,263,088   7/1966   Goldfischer.

RONALD L. WIBERT, *Primary Examiner.*

F. L. EVANS, *Assistant Examiner.*

U.S. Cl. X.R.

35—47; 250—236